United States Patent

[11] 3,607,853

| [72] | Inventors | Wolfgang Oberkirch |
| | | Cologne-Stammheim; |
| | | Peter Gunther, Opladen; Josef Witte, |
| | | Cologne-Stammheim, all of Germany |
| [21] | Appl. No. | 865,183 |
| [22] | Filed | Oct. 9, 1969 |
| [45] | Patented | Sept. 21, 1971 |
| [73] | Assignee | Farbenfabriken Bayer Aktiengesellschaft |
| | | Leverkusen, Germany |
| [32] | Priority | Oct. 25, 1968 |
| [33] | | Germany |
| [31] | | P 18 05 158.6 |

[54] PROCESS FOR THE PREPARATION OF TRANS-POLYPENTENAMER
9 Claims, No Drawings

| [52] | U.S. Cl. | 260/93.1, |
| | | 252/429 B |
| [51] | Int. Cl. | C08f 3/02 |
| [50] | Field of Search | 260/93.1; |
| | | 252/429 B |

[56] References Cited
UNITED STATES PATENTS

| 3,380,981 | 4/1968 | Miller et al. | 260/93.7 |
| 3,449,310 | 6/1969 | Dall'Asta et al. | 260/93.1 |
| 3,476,728 | 11/1969 | Natta et al. | 260/93.1 |

*Primary Examiner*—Joseph L. Schofer
*Assistant Examiner*—Richard A. Gaither
*Attorney*—Connolly and Hutz

ABSTRACT: A process for the polymerization of cyclopentene with ring-opening, in which cyclopentene dissolved in an inert organic solvent is polymerized in the presence of a catalyst, characterized in that an organometallic mixed catalyst of a. a molybdenum, tungsten or tantalum salt, b. tertiary butyl hypohalite, c. an organic aluminum compound in the molar ratio of a : b : c as 1 : 0.1 to 5 : 0.8 to 15 is used.

PROCESS FOR THE PREPARATION OF TRANS-POLYPENTENAMER

It is known that cyclopentene can be polymerized by means of mixed organometallic catalysts based on organic aluminum compounds and tungsten salts. In this process ring opening occurs and linear unsaturated hydrocarbons are formed, in which the carbon-carbon double bonds have mainly the trans-configuration. A process for mass polymerization of cyclopentene with ring opening and formation of transpolypentenamer is described in British Pat. No. 1,010,860. This process, however, has serious disadvantages which inhibit its use on an industrial scale: The mass polymerization yields highly viscous reaction mixtures so that temperature control during polymerization is impossible. Furthermore, polymerization can only proceed to low conversions of 20-50 percent if an uncrosslinked polymer is desired which can be further processed. If polymerization is continued to higher conversions, insoluble cross-linked products are obtained which are of no technical interest. As can be seen from the examples in the above-mentioned British patent specification, very large quantities of catalyst have to be used. Lastly, long reaction times are required.

British Pat. No. 1,062,367 describes a process for the preparation of polyalkenamers in which the catalysts used are, inter alia, mixtures of a tungsten salt, (e.g. $WCl_6$), an oxygen compound which contains an oxygen-oxygen or and oxygen-hydrogen bond, and an organic aluminum compound. This process must also be carried out preferably in the absence of inert diluents, with the result that temperature control becomes impossible owing to the extremely high viscosities of the reaction mixture. Again in this process, only moderate yields of 30 to 50 percent are obtained with relatively large quantities of catalyst, although the reaction times are shorter.

In addition, considerable technical difficulties arise in stopping the polymerization in the said processes owing to the high viscosity of the reaction mixture. The removal of catalyst residues and uniform distribution of the stabilizer in the polymer become very difficult when the process is carried out on a large technical scale. If the processes described in the above-mentioned patent specifications are carried out in the presence of inert solvents such as aliphatic or aromatic hydrocarbons, the conversion of cyclopentene to polypentenamer is reduced to 10 to 20 percent so that the process becomes technically useless.

Object of this invention is a process for preparing trans-polypentenamer which comprises polymerizing cyclopentene dissolved in an inert solvent in the presence of a catalyst comprising a. a molybdenum, tungsten or tantalum salt,
b. tertiary butyl hypohalite
c. an organic aluminum compound in the molar ratio of $$a:b:c \text{ as } 1:0.1 \text{ to } 5:0.8 \text{ to } 15.$$

Polymerization in the context of this invention means polymerization with opening of the cyclopentene ring as illustrated in the following equation:

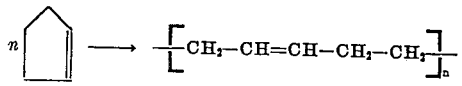

n constituting a whole number.

Another object is the catalyst composition consisting of
a. a molybdenum, tungsten or tantalum salt, especially the halides (chlorides, bromides, iodides)
b. tertiary butyl hypohalite (especially chlorite)
c. an organic aluminum compound in a molar ratio of $$a:b:c = 1:0.1 \text{ to } 5:0.8 \text{ to } 15.$$

The following are examples of catalyst components which may be used:

a. $MoCl_5$, $WCl_6$, $WBr_5$, $WCl_4O$, $TaCl_5$, $TaBr_5$.
b. $(CH_3)_3COCl$, $(CH_3)_3COBr$, $(CH_3)_3COI$,
c. aluminum trialkyls, e.g. $Al(C_2H_5)_3$, $Al(C_8H_{17})_3$, $Al(\text{iso } C_4H_9)_3$; aluminum haloalkyls, e.g. $Al(C_2H_5)_2Cl$, $Al(C_2H_5)_2Br$, $Al(C_2H_5)Cl_2$ and aluminum alkoxyalkyls, e.g. $Al(C_2H_5B\&2OC_2H_5$.

Alkyl in this context is preferably alkyl having 1-12 carbon atoms, alkoxy is preferably alkoxy having 1-12 carbon atoms, halogen is preferably chlorine and bromine and aluminum haloalkyls are of the type $Al(\text{Alkyl}) \text{ Halogen}_2$ or $Al(\text{Alkyl})_2 \text{ Halogen}$.

The catalyst components may be used in the following molar ratios:

$$a:b:c = 1:0.1 \text{ to } 5:0.8 \text{ to } 15.$$

0.1-8 mmol, preferably 0.3 to 4 mmol of the metal salt (a) is used for 100 g. of monomer.

The inert solvents used in the process may be aliphatic hydrocarbons such as butane, pentane, hexane or isooctane or cycloaliphatic hydrocarbons such as cyclohexane or aromatic hydrocarbons such as benzene, toluene or xylene or halogenated hydrocarbons such as chloroform or chlorobenzene. 5-50 percent by weight solutions of cyclopentene in these solvents may be used for the process. The monomers are preferably used in concentrations of 10-30 percent. An excess of monomer may also be used as solvent. The temperature for the preparation of catalyst may be from -60° to +60° C.

In a preferred embodiment of the process, the transition metal compound is added to the monomer solution first and then the tertiary butyl hypohalite and lastly the organic aluminum compound.

Polymerization starts at once after the addition of the organic aluminum compound. The polymerization temperature may be from -80° C. to +60° C., preferably between -40° C. and +30° C. The polymerization time is usually 1 to 5 hours. The conversion of cyclopentene to trans-polypentenamer obtained under these conditions is 80 to 90 percent or more. No gel is formed even at such high conversions.

The molecular weight of the polymers can be varied within wide limits by suitable choice of the catalyst components composition (molar ratio and sequence of the addition of the components). Viscosity numbers ($\eta$) of 0.8 to 6.0 dl/g. (at 25° C. in toluene) may be obtained.

By the process described herein, especially high molecular weight polymers of cyclopentene can be prepared with high conversion rates of 70 to 90 percent, completely free from gel, even with a monomer containing olefinic impurities. The products have especially valuable properties for technical application.

When the desired degree of conversion has been reached, polymerization is stopped e.g. by the addition of alcohols, carboxylic acids and/or amines. One of the usual products such as e.g. phenyl-$\beta$-naphthylamine, 2,6-ditertiary-butyl-4-methyl-phenol or 2,2'-dihydroxy-3,3'-ditertiary-butyl-5,5'-dimethyl-diphenyl methane is added to the polymer solution as stabilizer and age resister in quantities of 0.2 to 3 percent.

The polymer can be isolated by precipitation with an alcohol such as methanol, ethanol or isopropanol but the technically preferred method is to work up the polymer solution by introducing it into hot water and by that way distilling off unreacted monomer and an azeotropic mixture of solvent and water. The polymer is obtained as a suspension of lumps in water. It is separated from the water and dried in a drying chamber or on a belt conveyor or in a screw extruder.

Trans-polypentenamer is a rubbery polymer. It can be cross-linked with known vulcanization systems and worked up in rubber-processing machines.

These polymers and the vulcanizates produced from them have improved age resistance. Furthermore, they can be used for producing vulcanizates of high strength and excellent elastic properties which are either unfilled or slightly filled with fillers which are not reinforcing. Such vulcanizates have previously been obtainable only from natural rubber or from polyisoprene with an extremely high 1,4-cis structure, but these products have less age resistance than trans-polypentenamer.

EXAMPLE 1 a. 9000 g. of anhydrous benzene and 2200 g. of cyclopentene (32.4 mol.) are introduced under nitrogen into an autoclave equipped with a stirrer. 5.94 g. of tungsten hexachloride (15.0 mmol) are then added at room temperature, and when the tungsten salt has gone into solution, 15 ml. of 1 M tertiary butyl hypochlorite solution in toluene (15.0 mmol) are added with the exclusion of oxygen and moisture. The reaction mixture is then cooled to $-5°$ C. and 26.3 ml. of a 1 M aluminum triisobutyl solution in toluene (26.3 mmol) are added. Polymerization starts immediately. The polymerization temperature is kept at $0°$ C. by suitable external cooling. Conversion reaches 65 percent after 3 hours. Polymerization is then stopped by the addition of a mixture of 10 g. of 2,2'-dihydroxy-3,3'-ditertiary-butyl-5,5'-dimethyl-diphenyl-methane, 50 ml. of ethanol and 1000 ml. of benzene. The stopped and stabilized polymer solution is precipitated with 30 l of ethanol. The polymer is dried in vacuum at $50°$ C.

Double bond content 100 percent of the theoretical (determined by ICl titration). Trans double bond content = 91.0 percent (determined from the IR spectrum [1]). $(\eta)$ in toluene at $25°$ C. = 2.65 ML-4'/$100°$ C. = 145 b. If the same procedure is carried out as indicated in example 1 a. but without adding tertiary butyl hypochlorite to the catalyst, the yield is only 7 percent.

[1] Calculation: percent trans = $\frac{1/10 \cdot E \text{ trans}}{1/10 \cdot E \text{ trans} + 1/6 \cdot E \text{ cis}} \cdot 100$

EXAMPLE 2 a. 360 mg. of tantalum-V-chloride are dissolved in 50 ml. of chlorobenzene, 25 ml. of cyclopentene are added, the reaction mixture is then cooled to $-30°$ C. and 1 ml. of M tertiary butyl hypochlorite solution is added. The reaction mixture is reduced with 2.4 ml. of 50 percent ethyl aluminum dichloride solution in hexane. The mixture is stirred for 2½ hours at $-15°$ C. The polymerization is stopped with a mixture of 20 ml. of benzene, 6 ml. of isopropanol, 4 ml. of N-dimethylethanolamine and 0.3 g. of 2,2'-dihydroxy-3,3'-ditertiary-butyl-5,5'-dimethyldiphenylmethane.

The polymer is precipitated with about 1 l. of methanol and dried in vacuum at $50°$ C.

Yield 16 g. (85 percent)

Trans-double bond content: 82.4 percent b. If the same procedure is carried out as in Example 2a but without the addition of tertiary butyl hypochlorite, the yield is only 40 percent.

We claim:

1. A process for preparing trans-polypentenamer which comprises polymerizing cyclopentene dissolved in an inert solvent in the presence of a catalyst comprising (a) $MoCl_5$, $WCl_6$, $WBr_5$, $WCl_4O$, $TaCl_5$ or $TaBr_5$, (b) tertiary butyl hypohalite and (c) an organic aluminum compound in a molar ratio of (a):(b):(c) of 1:0:1 to 5:0.8 to 15.

2. The process of claim 1 wherein said polymerizing is carried out at a temperature of between $-80°$ and $60°$ C.

3. The process of claim 1 wherein (b) is tertiary butyl chlorite.

4. The process of claim 1 wherein (c) is aluminum trialkyl, aluminum haloalkyl or aluminimum alkoxyalkyl.

5. The process of claim 4 wherein (b) is tertiary butyl chlorite.

6. A catalyst comprising (a) $MoCl_5$, $WCl_6$, $WBr_5$, $WCl_4O$, $TaCl_5$ or $TaBr_5$, (b) tertiary butyl hypohalite and (c) an organic aluminum compound in a molar ratio of (a):(b):(c) of 1:0.1 to 5:0.8 to 15.

7. The catalyst of claim 6 wherein (b) is tertiary butyl chlorite.

8. The catalyst of claim 6 wherein (c) is aluminum trialkyl, aluminum haloalkyl or aluminum alkoxyalkyl.

9. The catalyst of claim 8 wherein (b) is tertiary butyl chlorite.